April 17, 1951  A. SAUNDERS  2,549,019
ROASTING DEVICE
Filed Oct. 17, 1949  3 Sheets-Sheet 1
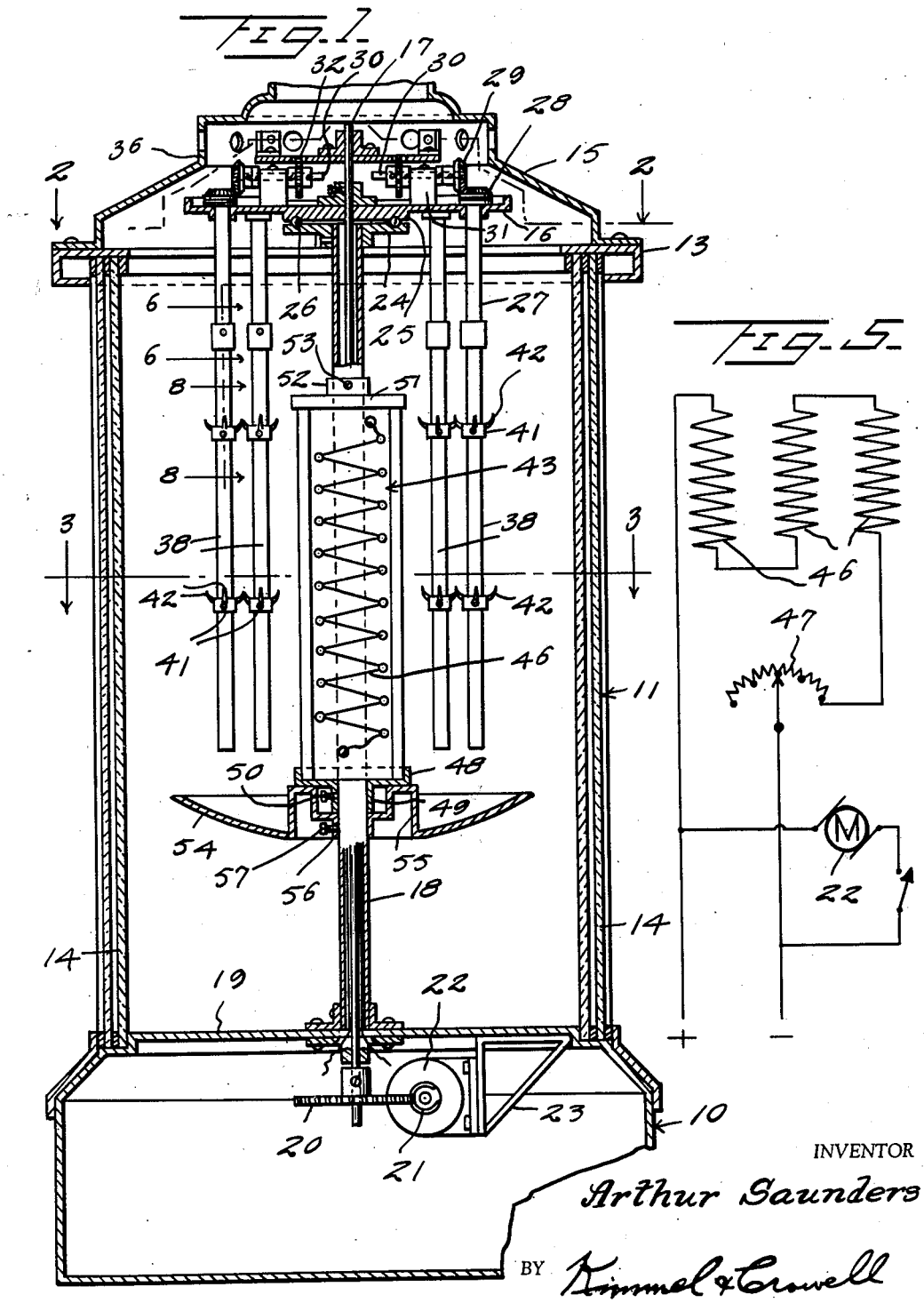
INVENTOR
Arthur Saunders
BY Kimmel & Crowell
ATTORNEYS April 17, 1951 A. SAUNDERS 2,549,019
ROASTING DEVICE
Filed Oct. 17, 1949 3 Sheets-Sheet 2
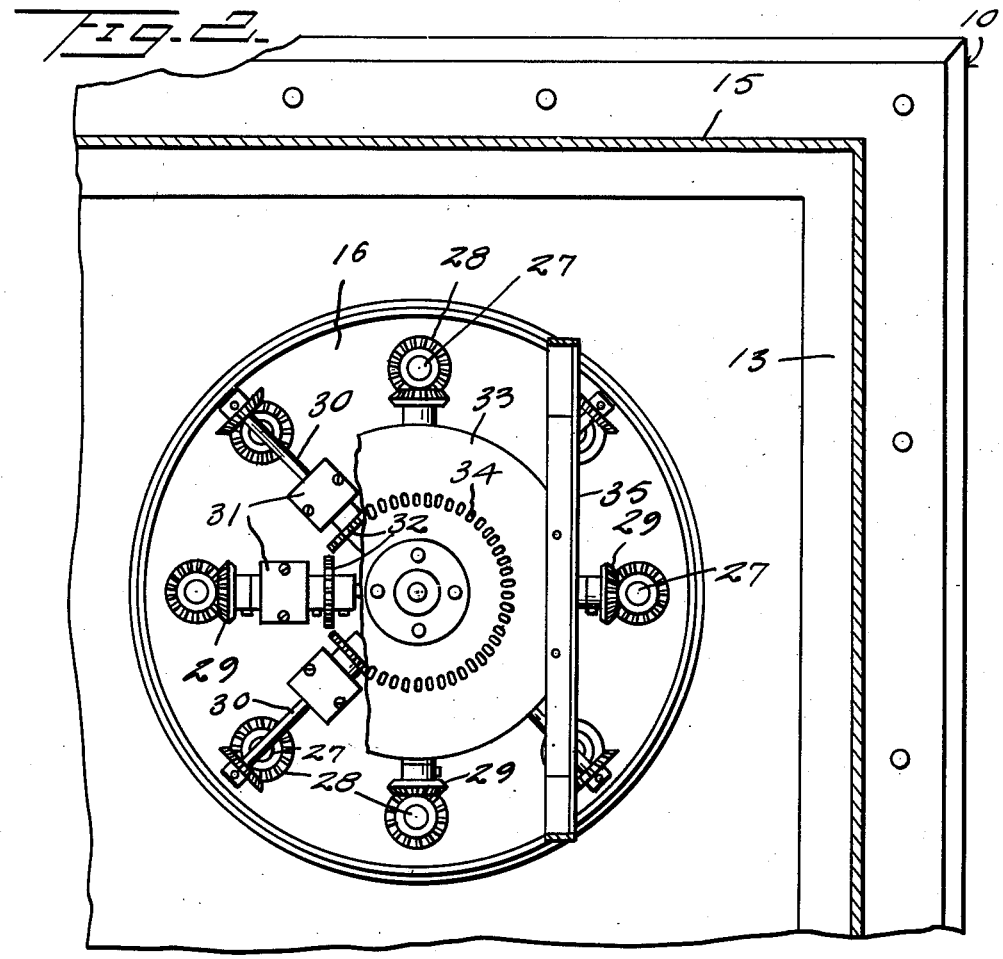
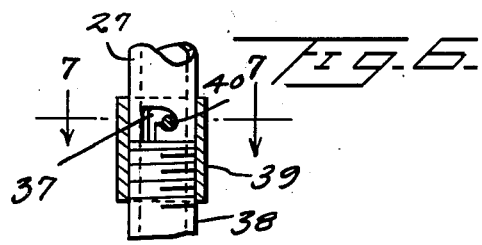
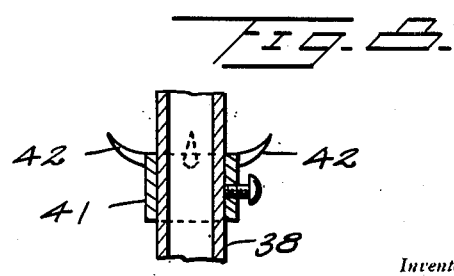
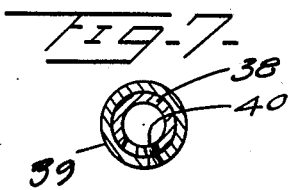
Inventor
Arthur Saunders
By Kimmel & Crowell
Attorneys April 17, 1951        A. SAUNDERS        2,549,019
ROASTING DEVICE
Filed Oct. 17, 1949        3 Sheets-Sheet 3
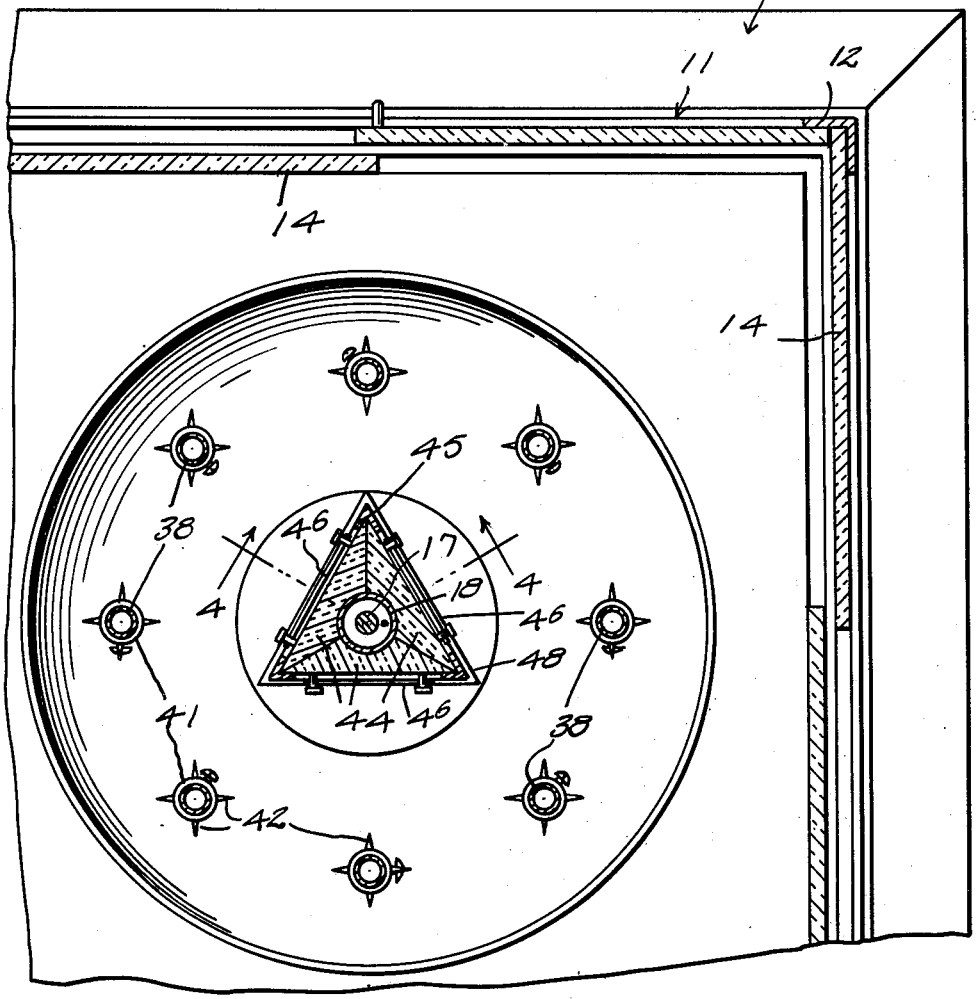
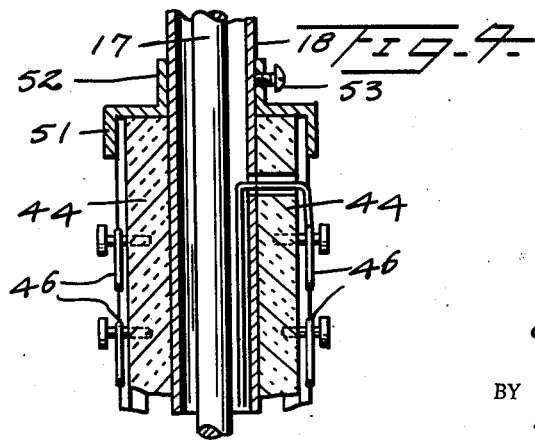
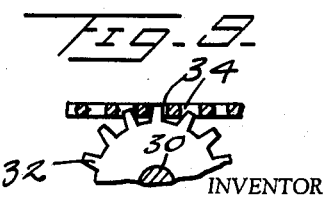
INVENTOR
Arthur Saunders
BY Kimmel & Crowell
ATTORNEYS Patented Apr. 17, 1951

2,549,019

UNITED STATES PATENT OFFICE 2,549,019

ROASTING DEVICE

Arthur Saunders, Norfolk, Va.

Application October 17, 1949, Serial No. 121,735

1 Claim. (Cl. 99—341)

This invention relates to visible roasting devices and is an improvement over the construction shown in Patent No. 1,790,488 issued January 27, 1931, for Display and Roasting Machine.

An object of this invention is to provide a display or visible roasting machine for roasting food products, such as frankfurters or the like, which is of simple and practical construction.

Another object of this invention is to provide in a rotary roaster of this kind an improved means for suspending the food articles, the suspension means being readily removable for cleaning or the like.

A further object of this invention is to provide an improved means for effecting rotation of the food suspension means.

A further object of this invention is to provide an improved means for removably supporting the electric heating element so that the latter may be readily assembled and vertically adjusted on the supporting column.

With the above and other objects in view, my invention consists in the arrangement, combination and details of construction disclosed in the drawings and specification, and then more particularly pointed out in the appended claim.

In the drawings,

Figure 1 is a vertical section partly broken away, of a roasting machine constructed according to an embodiment of this invention, Figure 2 is a fragmentary sectional view taken on the line 2—2 of Figure 1, Figure 3 is a fragmentary sectional view taken on the line 3—3 of Figure 1, Figure 4 is a fragmentary sectional view taken on the line 4—4 of Figure 3, Figure 5 is a diagrammatic view showing the electric circuits embodied in this invention, Figure 6 is a fragmentary sectional view taken on the line 6—6 of Figure 1, Figure 7 is a sectional view taken on the line 7—7 of Figure 6, Figure 8 is a fragmentary sectional view taken on the line 8—8 of Figure 1, Figure 9 is a fragmentary vertical section of the rotating means for the depending food supporting shafts.

Referring to the drawings, the numeral 10 designates generally a hollow base which has mounted thereon a transparent housing generally designated as 11. The housing 11 includes upright angle-shaped frame members 12, and a top member 13 which is fixed to the upper ends of the angle members 12. The housing 11 is substantially square in transverse section and includes sliding pairs of transparent panels 14. The panels 14 are horizontally slidable so that access may be had to the interior of the housing 11 from any side thereof.

A cap 15 is secured to the top member 13 and is adapted to enclose the rotary head as will be hereinafter described. A circular plate or head member 16 is disposed within the cap 15 and is secured to the upper end of a drive shaft 17. The drive shaft 17 extends vertically and downwardly through a tubular supporting column 18 which is fixed to the bottom wall 19 of the housing 11, and the lower end of the shaft 17 has fixed thereto a worm gear 20 with which meshes a worm 21 driven by a motor 22. The motor 22 is disposed within the hollow base 10 and is supported from a bracket 23. The column 18 has fixed to the upper end thereof one part 24 of a bearing for the head or plate 16, and the head or plate 16 has fixed thereto a second part 25 of an antifriction bearing. Balls 26 are interposed between the two bearing plates or races 24 and 25.

The plate or head 16 has depending therefrom a plurality of circumferentially spaced apart tubular shafts 27, and each shaft 27 has fixed on the upper end thereof above the plate 16 a bevelled gear 28. A bevelled gear 29 is mounted on a horizontally disposed shaft 30 which is journalled in a bearing 31 fixed to the plate 16, and each shaft 30 also has fixed thereto an inner gear 32 which meshes with a stationary ring gear 33. In the present instance the ring gear 33 is constructed in the form of a plate which is formed with a plurality of circumferentially spaced openings forming spaced gear teeth 34 with which the gear teeth 32 engage.

The gear 33 is held against rotation by means of a pair of gear supporting bars 35 which are fixed to the upper side of the gear 33 and are also fixed at the opposite ends thereof to an offset portion 36 of the cap 15. Each tubular shaft 26 is formed at the lower end thereof with a bayonet slot 37, and an extension shaft or food suspending member 38 is releasably coupled to the shaft 27 by means of a coupling sleeve 39 having one or more pins 40 which are engageable in the bayonet slots 37.

Each shaft extension 38 has secured thereon a pair of collars 41 and each collar 41 has secured thereto a plurality of outwardly extending food supporting pins 42. The food articles such as frankfurters or the like are engaged with a pin 42 and then suspended vertically in parallel relation to the shaft extension 38.

The food articles are roasted or cooked by means of an electric heating unit generally designated as 43 which is removably mounted on the column 18. The heating unit 43 includes a plurality of dielectric elongated bodies 44 which engage about the column 18 and have their outer edges encompassed by upright angle members 45. Each dielectric body 44 has secured to the outer side thereof a heating element or wire 46 adapted to be connected to a source of electric current supply, and preferably the heating elements which in the present instance are three in number, are connected together in series, and as shown in Figure 5, a rheostat 47 is interposed in one side of the conductors leading to the heating elements 46.

The angle members 45 at their lower ends are engaged in a lower cap 48 which is formed with a bushing 49 secured by means of a set screw 50 to the column 18. An upper cap 51 engages over the upper ends of the angle members 45 and includes an upwardly extending bushing 52 which is secured by fastening means 53 to the column 18. By constructing the heating unit as hereinbefore described, this unit can be readily assembled about the column 18, the angle members 45 holding the dielectric pieces together and the upper and lower caps firmly holding the angle members in operative position.

A drip collector or pan 54 is disposed at the lower end of the heating unit 43, being formed with a centrally disposed offset portion 55 which includes a bushing 56 secured by fastening means 57 to the column 18.

In the use and operation of this device, the food articles are suspendingly mounted on the shafts 38 with one article engaging a supporting or suspending pin 42. The motor 22 is then operated and the heating unit 43 connected with the electric circuit. With motor 22 operating shaft 17 will rotate head 16 so that the shafts 27—38 will be rotated about their own axes and about the axis of the shaft 17.

As shown in Figure 2, alternate ones of the gears 29 are disposed on the outer sides of the bevelled gears 28 so that alternate ones of the shafts 27—38 will rotate in opposite directions from the adjacent shafts. The drippings from the food articles will be collected in the collector or pan 54 and when the articles have been thoroughly cooked or roasted they may be removed from the suspension hooks or pins 42. When it is desired to repair or replace the heating unit, the upper cap 51 may be moved upwardly releasing the angle bars 45 so that each heating element may be removed from about the stationary supporting column 18. The electric wires to the heating unit are preferably extended upwardly through the tubular column 18. When it is desired to clean the suspension shafts 38, these shafts may be removed by partial rotation with respect to the upper shafts 27. The upper shafts 27 are normally disposed above the food articles so that they will not normally become corroded or coated with any grease or oil from the food articles.

I do not mean to confine myself to the exact details of construction herein disclosed, but claim all variations falling within the purview of the appended claim.

What I claim is:

A roasting device comprising a housing, an upright tubular member fixed centrally of said housing, a bearing plate fixed to the upper end of said tubular member, a head plate rotatably mounted on said bearing plate, a drive shaft fixed to said head plate and extending downwardly through said tubular member, a plurality of rotatable shafts dependingly carried by said head plate, a gear on the upper end of each of said latter shafts, a plurality of radially disposed shafts above said head plate, bearings for said radial shafts carried by said head plate, outer gears carried by said radial shafts meshing with said first named gears, a ring gear, means fixedly securing said ring gear relative to said housing in a position overlying said radial shafts, inner gears carried by said radial shafts meshing with said ring gear, food suspension means carried by said depending shafts, a heater about said tubular member confronting said food suspension means, and means for rotating said drive shaft.

ARTHUR SAUNDERS.

REFERENCES CITED

The following references are of record in the file of this patent:

UNITED STATES PATENTS

| Number | Name | Date |
|---|---|---|
| 601,812 | Michel | Apr. 5, 1898 |
| 1,762,035 | Soylian | June 3, 1930 |
| 1,790,488 | Saunders et al. | Jan. 27, 1931 |
| 1,838,545 | Guffey | Dec. 29, 1931 |
| 2,012,702 | Zolotas | Aug. 27, 1935 |
| 2,049,481 | Walterspiel | Aug. 4, 1936 |
| 2,205,914 | Stafford | June 25, 1940 |
| 2,211,024 | Nardin | Aug. 13, 1940 |